US012769361B2

(12) United States Patent
Yan

(10) Patent No.: US 12,769,361 B2
(45) Date of Patent: Oct. 20, 2026

(54) SMART WEARABLE RING DEVICE

(71) Applicant: Guangdong Youhong Medical Technology Co., Ltd., Dongguan (CN)

(72) Inventor: Hongwu Yan, Dongguan (CN)

(73) Assignee: Guangdong Youhong Medical Technology Co., Ltd., Dongguan (CN)

( * ) Notice: Subject to any disclaimer, the term of this patent is extended or adjusted under 35 U.S.C. 154(b) by 207 days.

(21) Appl. No.: 18/434,733

(22) Filed: Feb. 6, 2024

(65) Prior Publication Data

US 2025/0224766 A1 Jul. 10, 2025

(30) Foreign Application Priority Data

Jan. 6, 2024 (CN) ......................... 202410019873.0

(51) Int. Cl.
*G06F 1/16* (2006.01)

(52) U.S. Cl.
CPC .................................... *G06F 1/163* (2013.01)

(58) Field of Classification Search
CPC .......... A44C 9/00; A44C 9/0053; G06F 1/163
USPC ..................................................... 361/679.03
See application file for complete search history.

(56) References Cited

U.S. PATENT DOCUMENTS 10,817,171 B2 * 10/2020 Warren ................ A61B 5/6826
2025/0000218 A1 * 1/2025 Lämsä ............... A61B 5/02438
2025/0017531 A1 * 1/2025 Barison ................ A61B 5/6826

FOREIGN PATENT DOCUMENTS

CN 206852194 U 1/2018
CN 217338582 U 9/2022

* cited by examiner

*Primary Examiner* — Imani N Hayman
*Assistant Examiner* — Ross Terry Mularski
(74) *Attorney, Agent, or Firm* — JEEN IP LAW, LLC

(57) ABSTRACT

A smart wearable device is provided. The smart wearable device includes a casing, the casing includes a first casing, a second casing, and a connection casing. The first casing and the second casing arranged at intervals relative to each other and both are annular. The connection casing is arranged between the first casing and the second casing, at least one of the connection casing, the first casing, and the second casing is made of non-metallic materials. The technical solution reduces overall weight and material cost of the smart wearable device, and improves overall comfort of the smart wearable device, and further improves accuracy of human-computer interaction and signal transmission of the smart wearable device, and improves performance of the smart wearable device.

7 Claims, 8 Drawing Sheets

13

SMART WEARABLE RING DEVICE

CROSS REFERENCE TO RELATED APPLICATIONS

The present application claims the benefit of Chinese Patent Application No. 202410019873.0 filed on Jan. 6, 2024, the contents of which are incorporated herein by reference in their entirety.

FIELD

The subject matter herein generally relates to a field of wearable device, and particularly to a smart wearable device.

BACKGROUND

With advancement of social sciences, people have higher and higher requirements for wearable devices, which are not only limited to beauty and fashion, but also begin to focus on detecting people's health indicators and physiological parameters through smart wearable devices.

With the development of smart mobile phones, the development of smart wearable devices is greatly promoted, many technologies in smart mobile phones have also been applied to the field of wearable devices, thus giving birth to the smart wearable devices, an emerging smart product. Popular smart wearable devices currently on the market include watches, bracelets, or rings.

A patent application with an application number of CN201720675953.7 discloses a smart ring. The smart ring is made of jade, grandmother, crystal, sapphire, emerald, agate, shellfish, precious wood, ceramics or carbon fiber, the ring includes an outer ring and an inner ring that are set separately and bonded together, an annular inner cavity is formed between an outer peripheral wall of the inner ring and an inner peripheral wall of the outer ring, where smart chips and induction coils are arranged, the smart chips can be CPU chips, IC chips, ID Chip, NFC chip, or RFID chips including electronic tags.

A patent application with an application number of CN202220939076.0 discloses a health monitoring ring, which includes a casing, a battery, and a circuit board; the casing is in a shape of a ring, and an accommodation space is arranged in the casing, the battery and the circuit board are arranged in the accommodation space; the battery is curved, and a curvature of the battery is the same as a curvature of the casing; the circuit board is a flexible circuit board, and there are monitoring components on the circuit board, and the battery is connected with the circuit board.

However, the smart wearable devices currently on the market have the following technical problems, the existing smart wearable devices are heavy, making people uncomfortable after wearing for a long time; and the human-computer interaction and signal transmission are inaccurate.

SUMMARY

In order to solve the above technical problems, a smart wearable device is provided. The smart wearable device includes a casing, the casing includes a first casing, a second casing, and a connection casing. The first casing and the second casing arranged at intervals relative to each other and both are annular. The connection casing is arranged between the first casing and the second casing, at least one of the connection casing, the first casing, and the second casing is made of non-metallic materials. The first casing, the second casing, and the connection casing surrounds as an annular cavity. The smart wearable device includes a circuit assembly, the circuit assembly is arranged in the annular cavity. The smart wearable device includes a filling member cooperated with the casing.

In one embodiment, the casing, the circuit component, and the filling member are arranged in sequence from outside to inside, the circuit assembly is accommodated between the casing and the filling member.

In one embodiment, a density of materials of the connection casing is less than a density of materials of the first casing and/or the second casing.

In one embodiment, the connection casing is made of the non-metallic materials, and the first casing and the second casing are made of metal materials.

In one embodiment, the first casing includes a first inner surface; the second casing includes a second inner surface; the connection casing includes: a connection member; one end of the connection member is contacted with the first inner surface, and another end of the connection member is contacted with the second inner surface; and a connection body; the connection body and the connection member are formed integrally, the connection body is sandwiched between the first casing and the second casing.

In one embodiment, the first casing includes a first side surface; the second casing includes a second side surface; the first side surface faces the second side surface, the connection casing is arranged between the first side surface and the second side surface.

In one embodiment, the annular cavity has a depth; the circuit assembly includes a number of electronic components, and each of the number of electronic components has a height; the height of at least one of the number of electronic components is greater than or equal to the depth of the annular cavity.

In one embodiment, the circuit assembly includes: a circuit board that is a bendable circuit board; a power module electrically coupled to the circuit board; a signal module arranged on the circuit board and electrically coupled to the power module; and a processor arranged on the circuit board, and is electrically coupled to the signal module.

In one embodiment, the bendable circuit board includes: a number of rigid circuit boards, a quantity of the number of rigid circuit boards is greater than or equal to 3; and a number of flexible connection members arranged between the number of rigid circuit boards.

In one embodiment, the signal module includes: a number of light emitting units; and a number of sensing units arranged at intervals relative to the number of light emitting units.

In one embodiment, a surface of the filling member defines a convex bump, the convex bump corresponds to a position of each of the number of sensing units.

The implementation of the technical solution reduces overall weight and material cost of the smart wearable device, and improves overall comfort of the smart wearable device, and further improves accuracy of human-computer interaction and signal transmission of the smart wearable device, and improves performance of the smart wearable device.

BRIEF DESCRIPTION OF THE DRAWINGS

In order to clearly explain technical solutions of embodiments of the present disclosure or in the related art, drawings used in the description of the embodiments or the related art are briefly described below. Obviously, the drawings as described below are merely some embodiments of the present disclosure. Based on these drawings, other drawings can be obtained by those skilled in the art without paying creative efforts.

DETAILED DESCRIPTION

Embodiments of the present disclosure will be clearly and completely described below with reference to the accompanying drawings in the embodiments of the present disclosure. Obviously, the described embodiments are only some, not all of the embodiments of the present disclosure. Based on the embodiments of the present disclosure, all other embodiments obtained by those of ordinary skill in the art without creative efforts fall within the scope of protection of the present disclosure.

Figure 1:
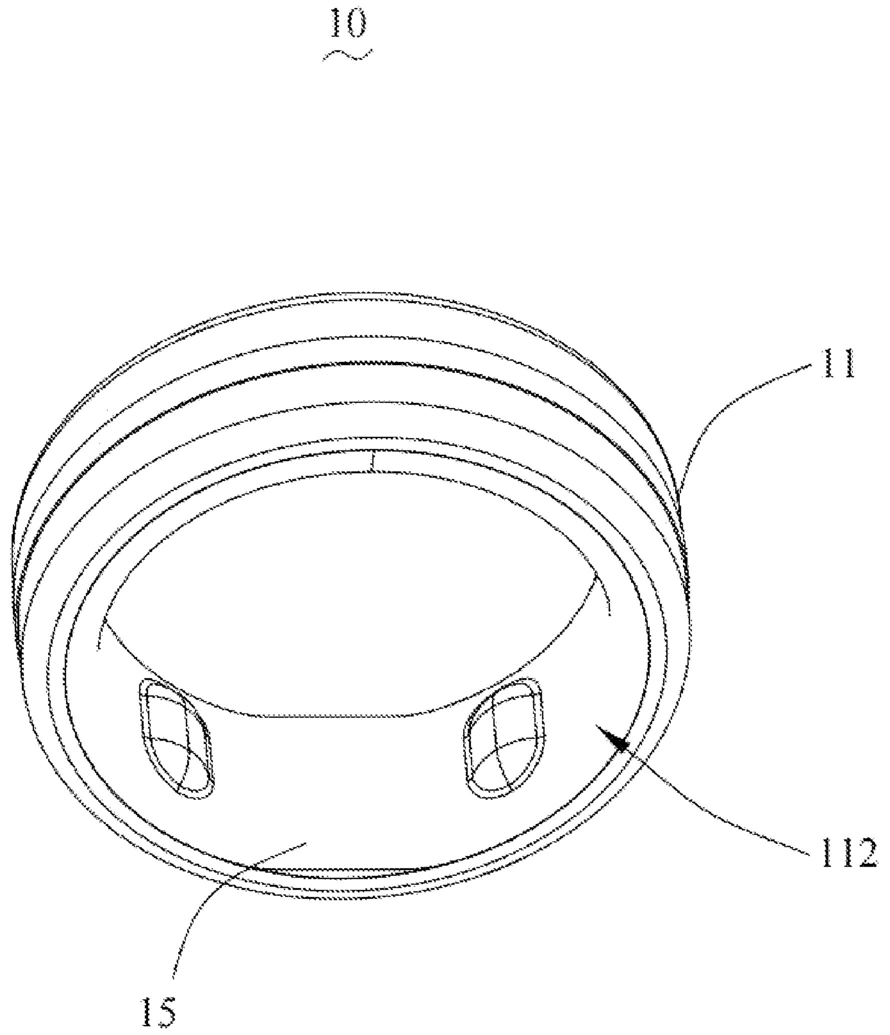
FIG. 1 provides an overall schematic view of an embodiment of a smart wearable device.
Figure 2:
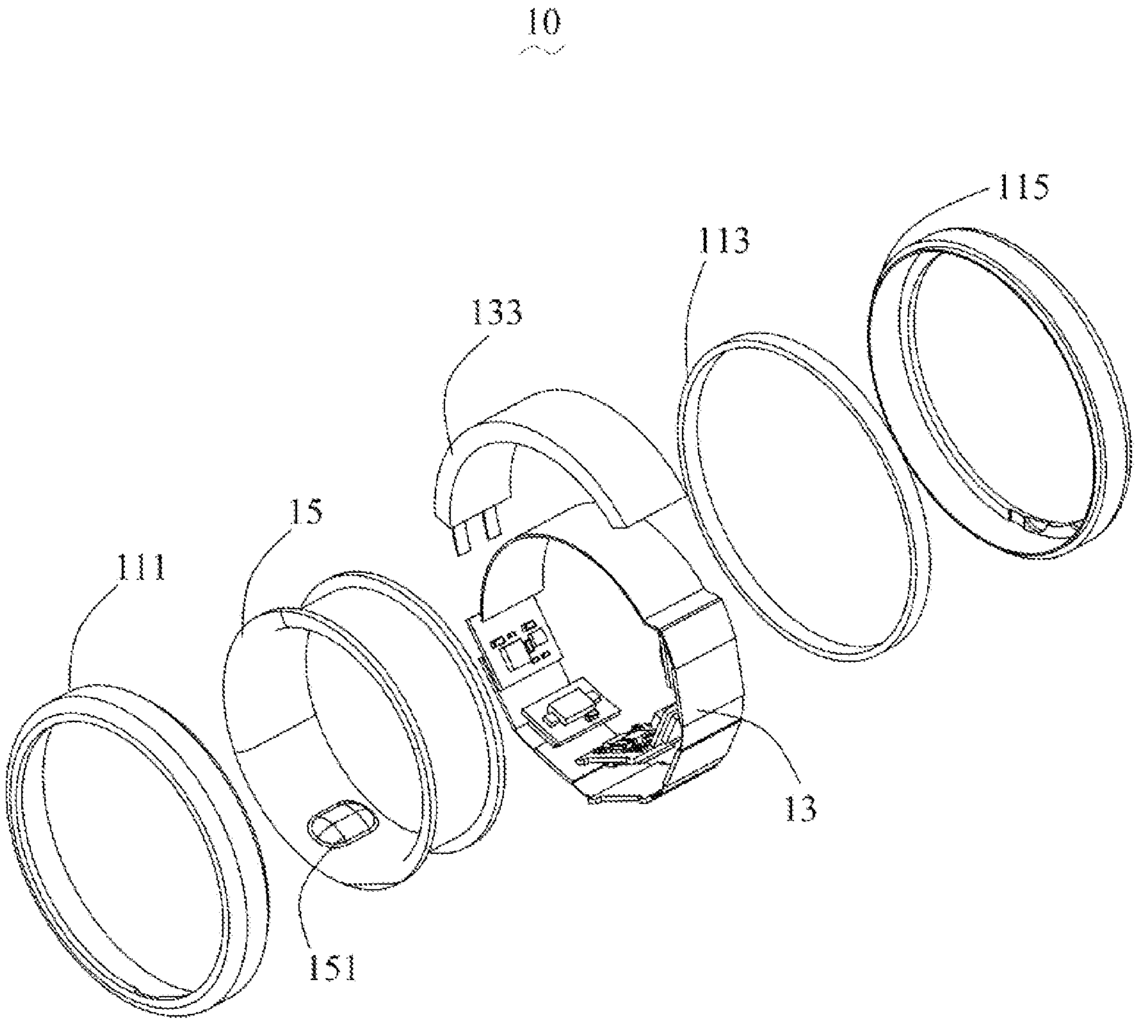
FIG. 2 provides a schematic view of an exploded structure of an embodiment of the smart wearable device.

Referring to FIGS. 1 and 2, FIG. 1 provides an overall schematic view of a smart wearable device; FIG. 2 provides a schematic view of an exploded structure of a smart wearable device. The smart wearable device 10 includes a casing 11, a circuit assembly 13, and a filling member 15, the casing 11, the circuit assembly 13, and the filling member 15 are arranged in sequence from outside to inside. The casing 11 and the filling member 15 accommodate the circuit assembly 13.

It should be noted that, the casing 11 surrounds as an annular cavity 112 that is open to the inside, and the circuit assembly 13 is arranged inside the annular cavity 112, the filling member 15 is filled into the annular cavity 112 to realize the accommodation of the circuit assembly 13.

The casing 11 includes a first casing 111, a second casing 115, and a connection casing 113, the first casing 111 and the second casing 115 are spaced apart, the connection casing 113 is arranged between the first casing 111 and the second casing 115, the first casing 111 and the second casing 115 are indirectly connected together through the connection casing 113. At least one of the connection casing 113, the first casing 111, and the second casing 115 is made of non-metallic materials, which is different from the prior art that all of them are made of metal materials. During use, it is found that when the casing 11 is made of metal materials, although it is easy to manufacture the casing 11, the metal materials may cause greater interference to the transmission and reception of signals, and may even form a shield, thereby resulting in certain signal errors or signal delays; the use of non-metal materials is equivalent to provide a signal transmission channel, which can improve the accuracy of human-computer interaction and signal transmission of the smart wearable device 10, thereby improving the performance of the smart wearable device 10.

In one embodiment, the first casing 111 and the second casing 115 are made of metal materials, and the connection casing 113 is made of non-metallic materials. The non-metallic materials include but are not limited to resin, rubber, plastic, glass, ceramics, or nanomaterials.

It should be noted that, the connection casing 113 is made of non-metallic materials, and the first casing 111 and the second casing 115 are made of metal materials, which meets the structural strength while reducing the cost. When the first casing 111 and the second casing 115 are made of metal materials, the strength requirement is met; by arranging the connection casing 113 with the non-metallic materials between the first casing 111 and the second casing 115 with the metal materials, the cost of the casing 11 is reduced.

It should be noted that the casings of similar smart wearable devices in the prior art are all metal casings, therefore, in another embodiment of the present disclosure, a density of the connection casing 113 is less than that of the first casing 111 and the second casing 115, such design makes the overall weight of the casing 11 lighter relative to the all-metal casing by reducing the local density of the casing 11. When the users wear the smart wearable device 10, the smart wearable device 10 appears lighter, thus, the users has better wearing experiences.

Figure 4:
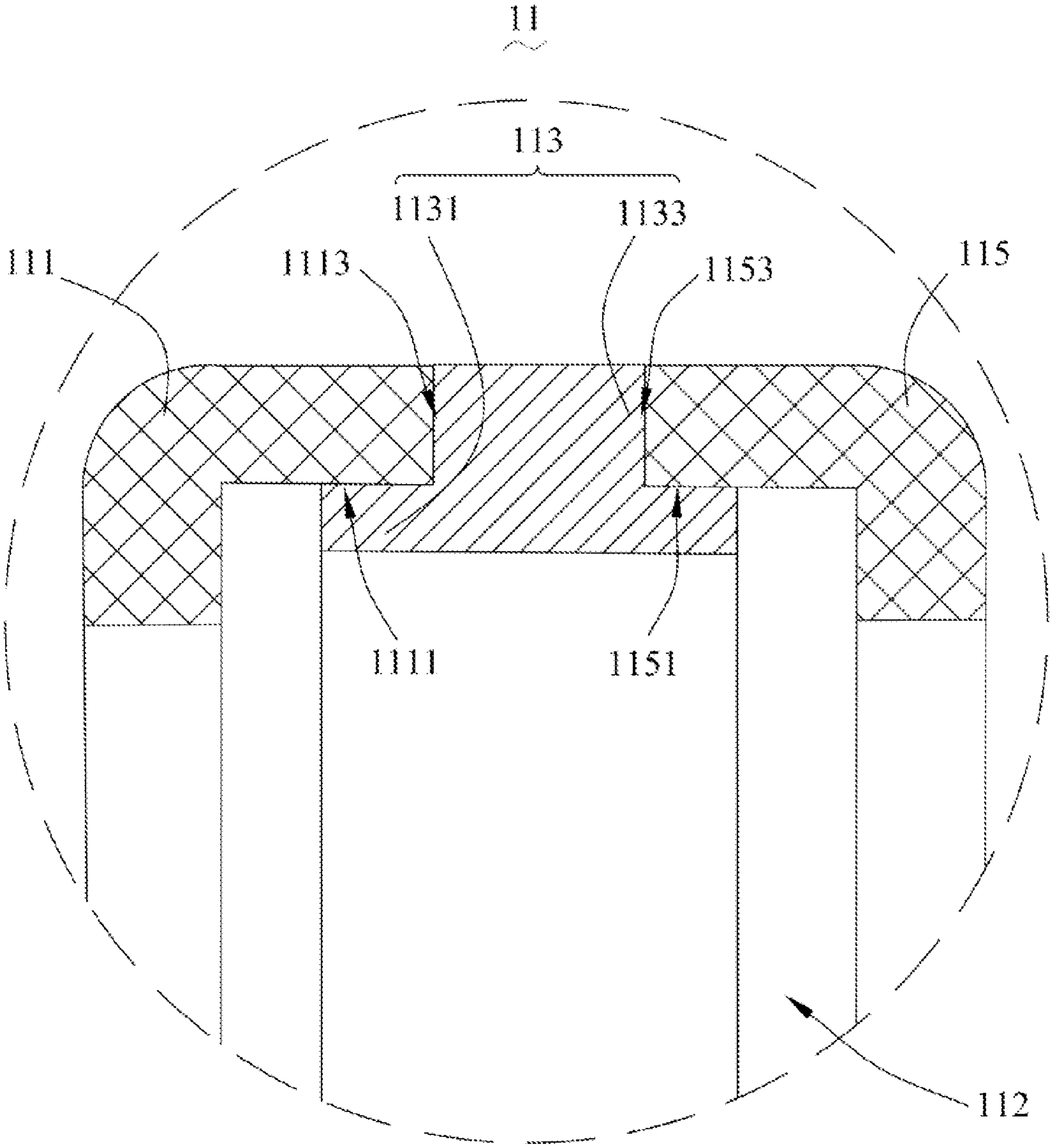
FIG. 4 provides a structural schematic view of a second embodiment of the casing in FIG. 2.

Further, in the structural design of the casing 11 of the smart wearable device 10, since the connection casing 113 is arranged between the first casing 111 and the second casing 115, higher requirements are put forward for the overall connection firmness and tightness of the casing 11, based on this, the present disclosure, on the premise of reducing weight and cost, in order to improve the overall firmness and strength of the casing 11, the casing 11 is laid out as follows:

Referring to FIG. 4, FIG. 4 provides a schematic structural view of the second embodiment of the casing in FIG. 2. The first casing 111 includes a first inner surface 1111 and a first side surface 1113, and the first inner surface 1111 and the first side surface 1113 are perpendicular to each other. At the same time, the structure of the second casing 115 is similar to that of the first casing 111, the second casing 115 includes a second inner surface 1151 and a second side surface 1153, and the second side surface 1153 and the second side surface 1153 are perpendicular to each other. It should be noted here that, the first inner surface 1111 and the first side surface 1113, the second inner surface 1151 and the second side surface 1153 may also be arranged non-vertically, and an angular relationship is consistent with the connection casing 113, which ensures that the first casing 111 and the second casing 115 can fully fit and contact the connection casing 113, thereby increasing the firmness of the casing.

The connection casing 113 includes a connection member 1131 and a connection body 1133, the connection body 1133 and the connection member 1131 are formed integrally, a cross section of the connection body 1133 and the connection member 1131 appears as a convex shape.

During a connection process of the first casing 111, the second casing 115, and the connection casing 113, one end of the connection member 1131 is contacted with the first inner surface 1111, and another end of the connection member 1131 is contacted with the second inner surface 1151. The connection body 1133 is sandwiched between the first side surface 1113 and the second side surface 1153.

It should be noted that, the specific structure of the connection member 1131 may be arranged at intervals, and a number of the connection members 1131 may be arranged at intervals in the connection casing 113, or the connection members 1131 may be in an annular structure. That is, when the connection members 1131 are arranged at intervals, the cross section of the connection casing 113 is in the convex shape at intervals; when the connection members 1131 are designed to cover a circle, the connection casing 113 and the cross-section are all in the convex shape.

It should be noted that, one end of the connection member 1131 is contacted with the first inner surface 1111 and the other end of the connection member 1131 is contacted with the second inner surface 1151, the connection body 1133 is sandwiched between the first side surface 1113 and the second side surface 1153. Through such technical solution, the connection between the first casing 111, the second casing 115, and the connection casing 113 is realized, and the contact area between the first casing 111, the second casing 115, and the connection casing 113 are enlarged as much as possible, the firmness of the casing 11 increases, so that the casing 11 in the present disclosure can reduce weight and cost while also meeting the requirements of the strength and firmness.

Similarly, in the following embodiments, one end of the connection member 1131 is contacted with the first inner surface 1111, and the other end of the connection member 1131 is contacted with the second inner surface 1151, and the connecting body 1133 is sandwiched between the first side surface 1113 and the second side surface 1153. The technical problems solved and the technical effects achieved of such technical means are the same as this embodiment.

Figure 5:
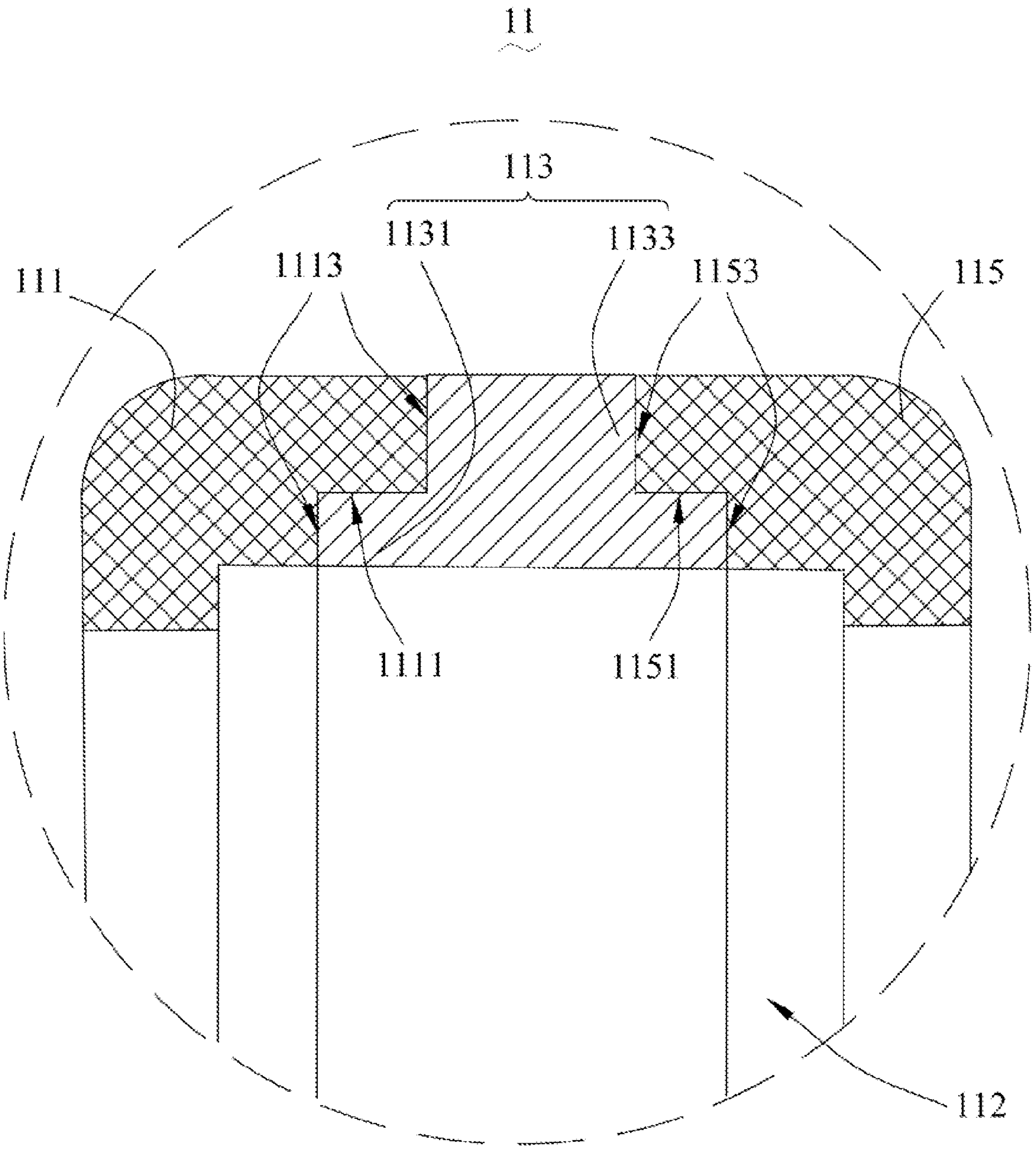
FIG. 5 provides a structural schematic view of a third embodiment of the casing in FIG. 2.

Referring to FIG. 5, FIG. 5 provides a schematic structural view of the third embodiment of the casing in FIG. 2. In another embodiment, the structural design of the casing 11 of the smart wearable device 10 may also be in the following layout:

The first casing 111 includes a first side surface 1113, and the first inner surface 1111 and the first side surface 1113 are perpendicular to each other. At the same time, the structure of the second casing 115 is similar to that of the first casing 111, the second casing 115 also includes a second inner surface 1151 and a second side surface 1153, and the second inner surface 1151 and the second side surface 1153 are perpendicular to each other.

It should be noted that the first side surface 1113 and the second side surface 1153 have a stepped structure.

The connection casing 113 includes a connection member 1131 and a connection body 1133, the connection body 1133 and the connection member 1131 are formed integrally, the cross section of the connection body 1133 and the connection member 1131 appears as a convex shape.

During the connection process of the first casing 111, the second casing 115, and the connection casing 113, one end of the connection member 1131 is contacted with the first inner surface 1111, and another end of the connection member 1131 is contacted with the second inner surface 1151. The connection body 1133 is sandwiched between the first side surface 1113 and the second side surface 1153.

Figure 3:
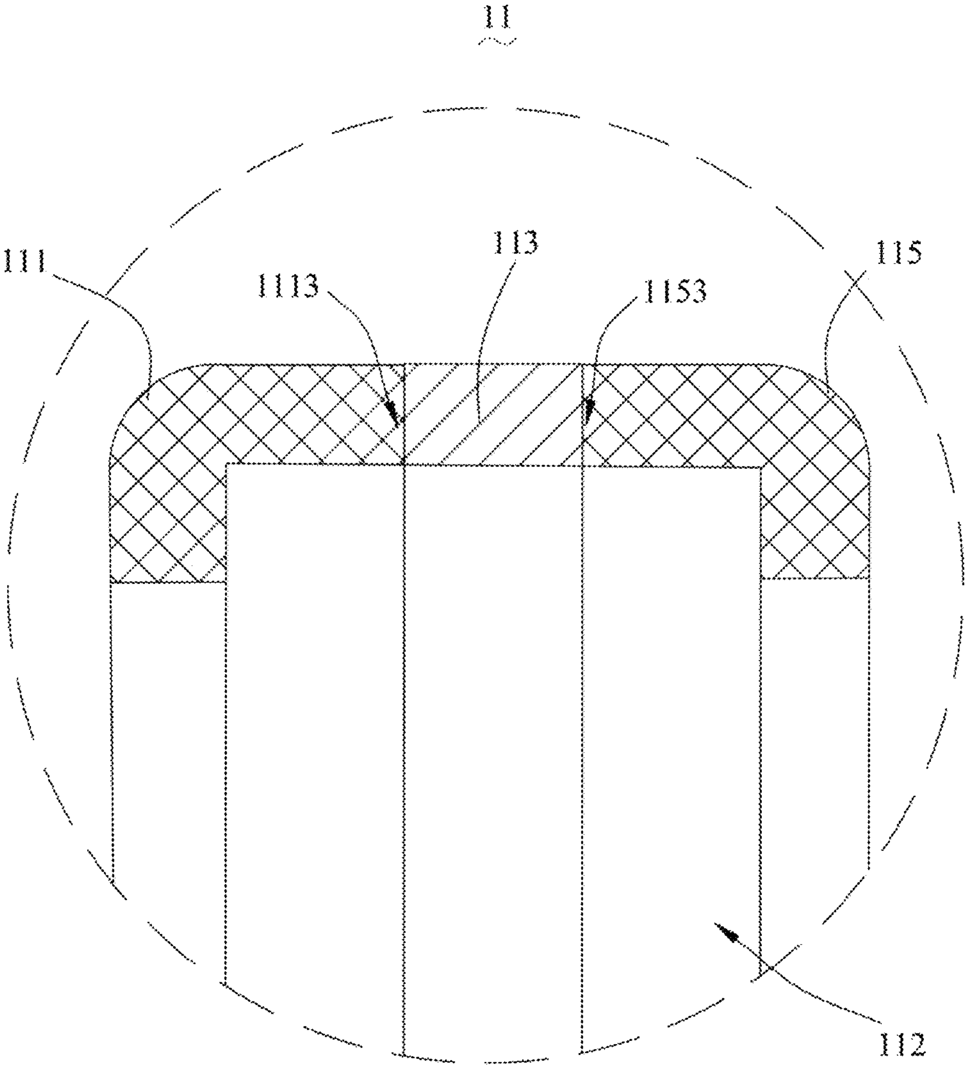
FIG. 3 provides a structural schematic view of a first embodiment of a casing in FIG. 2.

It should be noted that FIG. 3 provides a schematic structural view of the first embodiment of the casing in FIG. 2; the specific structure of the connection members 1131 may be arranged at intervals or arranged integrally. That is, when the connection members 1131 are arranged at intervals, the cross section of the connection casing 113 is in the convex shape at intervals; when the connection member 1131 is designed to surround a circle, the connection casing 113 and the cross-section are all in the convex shape.

As illustrated in FIG. 3, FIG. 3 provides a schematic structural view of the first embodiment of the casing in FIG. 2; in another embodiment, the designed structure of the casing 11 of the smart wearable device 10 can also be laid out as follows:

The first casing 111 includes a first side surface 1113, at the same time, the structure of the second casing 115 is similar to that of the first casing 111 and also includes a second side surface 1153.

It should be noted that the first side surface 1113 and the second side surface 1153 have a stepped structure.

The connection casing 113 includes a connection body 1133.

During the connection process of the first casing 111, the second casing 115, and the connection casing 113, the connection body 1133 is sandwiched between the first side surface 1113 and the second side surface 1153.

Figure 6:
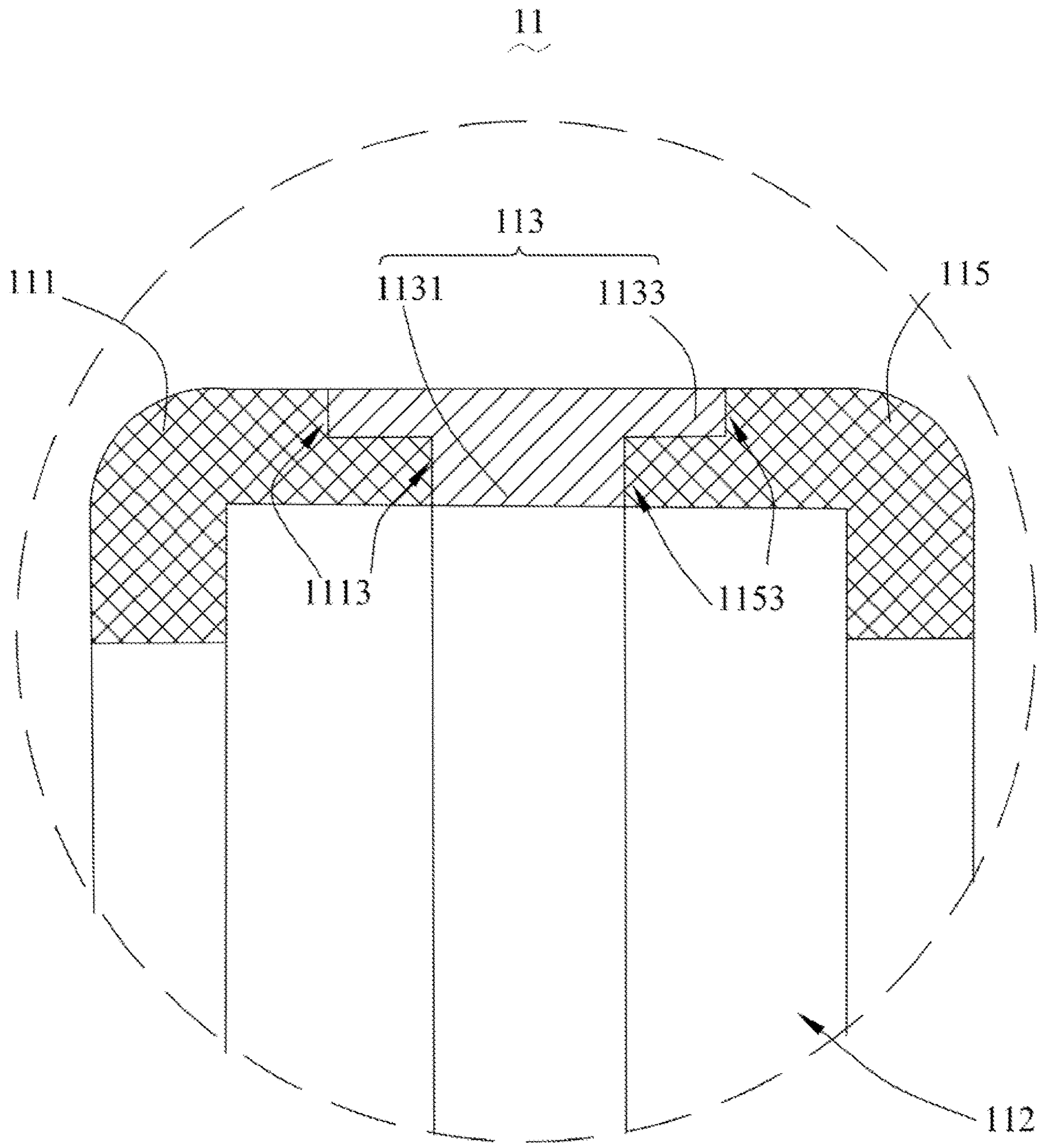
FIG. 6 provides a structural schematic view of a fourth embodiment of the casing in FIG. 2.

Referring to FIG. 6, FIG. 6 provides a schematic structural view of the casing in a fourth embodiment in FIG. 2. In another embodiment, the structural design of the casing 11 of the smart wearable device 10 may also be in the following layout:

The first casing 111 includes a first inner surface 1111 and a first side surface 1113, and the first inner surface 1111 and the first side surface 1113 are perpendicular to each other. At the same time, the structure of the second casing 115 is similar to that of the first casing 111, and also includes a second inner surface 1151 and a second side surface 1153, the second inner surface 1151 and the second side surface 1153 perpendicular to each other.

It should be noted that the first side surface 1113 and the second side surface 1153 have a stepped structure.

The connection casing 113 includes a connection member 1131 and a connection body 1133, the connection body 1133 and the connection member 1131 are formed integrally, the cross section of the connection body 1133 and the connection member 1131 appears as an inverted convex shape.

During the connection process of the first casing 111, the second casing 115, and the connection casing 113, one end of the connection member 1131 is contacted with the first inner surface 1111, and another end of the connection member 1131 is contacted with the first inner surface 1111. The connection body 1133 is sandwiched between the first side surface 1113 and the second side surface 1153.

It should be noted that the specific structure of the connection members 1131 may be arranged at intervals or may be integrated. That is, when the connection members 1131 are arranged at intervals, the cross section of the connection casing 113 is in a convex shape at intervals; when the connection member 1131 is designed to surround a circle, the connection casing 113 and the cross-section are all in the convex shape.

Figure 7:
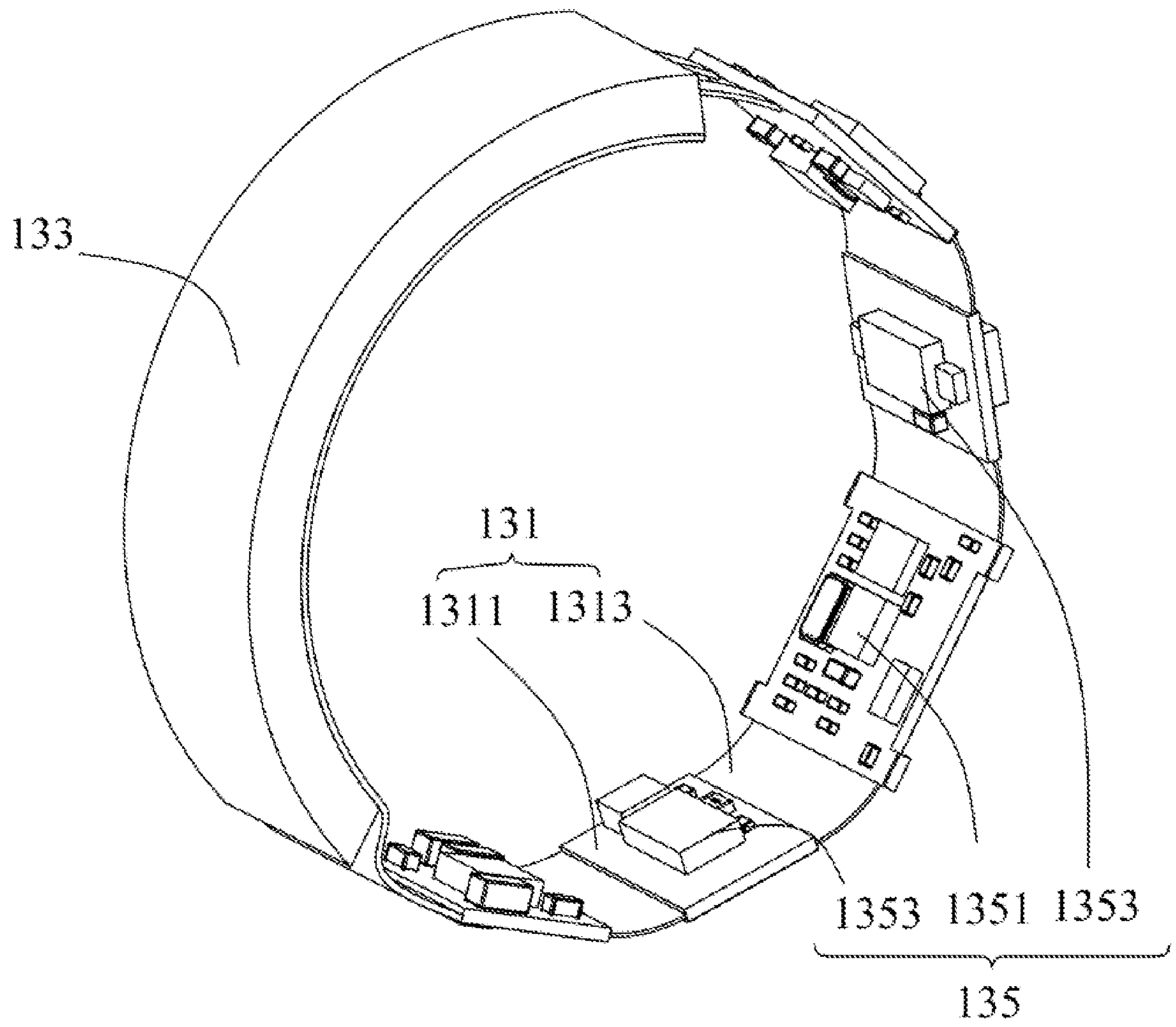
FIG. 7 provides a schematic view of a circuit structure of an embodiment of a circuit assembly in FIG. 2.
Figure 8:
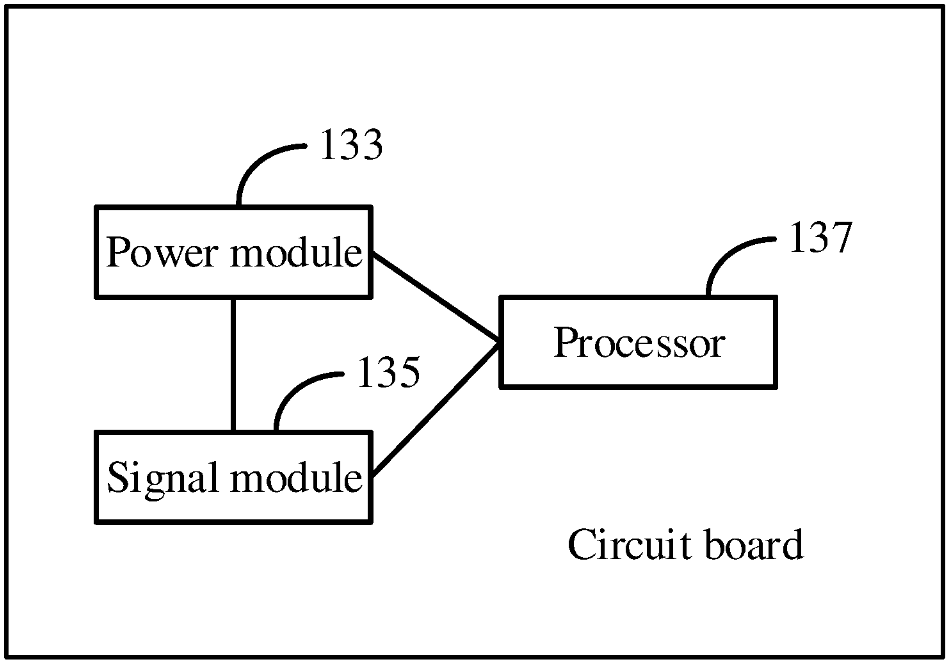
FIG. 8 provides a structural schematic view of an embodiment of the connection casing in FIG. 2.

Referring to FIGS. 7 and 8, FIG. 7 provides a schematic structural view of an embodiment of a circuit assembly mentioned in FIG. 2; FIG. 8 provides a schematic structural view of an embodiment of the connection casing in FIG. 2. The circuit assembly 13 includes a circuit board 131, a power module 133, a signal module 135, and a processor 137, the circuit board 131 is a bendable circuit board 131; the power module 133 is electrically coupled to the circuit board 131; the signal module 135 is arranged on the circuit board 131, and is electrically coupled to the power module 133; the processor 137 is arranged on the circuit board 131, and is electrically coupled to the signal module 135.

As illustrated in FIGS. 7 and 8 at the same time, the bendable circuit board 131 includes a number of rigid circuit boards 1311 and a number of flexible connection members 1313. A quantity of the rigid circuit boards 1311 is greater than or equal to 3; each flexible connection member 1313 is arranged between the number of rigid circuit boards 1311 and used to connect the number of rigid circuit boards 1311.

The circuit board 131 is designed to be bendable in order to meet the practical problem of curvature in the smart wearable device 10, so that the circuit board 131 should be designed to be bendable. In this way, the circuit board 131 can be accommodated into the annular cavity 112 in a relatively suitable manner.

Further, the bendable circuit board 131 here does not have to include rigid and flexible circuit boards, and may also be a flexible circuit board.

Further, the signal module 135 includes a number of light emitting units 1351 and a number of sensing units 1353, the light emitting units 1351 and the sensing units 1353 are arranged at intervals on the circuit board 131.

It should be noted that the light emitting unit 1351 may be a light emitting electronic component such as a light emitting diode (LED).

It should be noted that the sensing unit 1353 may be a photoelectric sensor such as a photodiode (PD).

During the human-computer interaction process, the light emitting unit 1351 emits light to illuminate a surface of the human arm or finger, the sensing unit 1353 receives signals formed by the light reflected by the human arm or finger, and the processor 137 processes the signals formed by the reflected light.

It should be noted that the signal module 135 can also process physiological signals such as temperature signals, pulse signals, exercise signals, and blood oxygen content.

Further, one surface of the filling member 15 is contacted with the human arm or finger, and the other surface is matched with the casing 11, and the human arm or finger and the casing fix the circuit assembly 13.

A surface of the filling member 15 defines a convex bump 151, and the convex bump 151 corresponds to a position of the sensing unit 1353.

When the sensing unit 1353 receives the signals formed by the light reflected by the human arm or finger, the design of the convex bump 151 draws on a principle of a convex lens to focus more light, so that the sensing unit 1353 can receive light more effectively.

It should be noted that when there are a number of sensing units 1353, the convex bump 151 and the sensing unit 1353 are arranged correspondingly, and there are also a number of convex bumps 151.

It should be noted that since the filling member 15 arranged is between the human body and the circuit assembly 13, the interaction between the signal module 135 on the circuit assembly 13 and the human body is realized through the above-mentioned optical signals. Therefore, there is a transparent or translucent area in at least part of the filling member 15, which facilitates the optical signal to pass through the filling member 15, thereby realizing the interaction between the human body and the circuit assembly 13.

It should be noted that, at least at the convex bump 151, the filling member 14 is transparent or translucent, so that the optical signals transmit between the human body and the circuit assembly 13 through the convex bump 151.

It should be noted that the annular cavity 112 has a certain depth, which can accommodate the electronic components in the circuit assembly 13, the electronic components also have a certain height, but according to the actual manufacture experiences, the height of the electronic components is greater than the depth of the annular cavity 112. At this time, a filling member 15 is arranged to cover and fill the entire circuit assembly 13.

Further, since the height of the electronic components fluctuates and there are many gaps inside the annular cavity 112, the present disclosure adopts the design of the filling member 15, and one side the filling member 15 pours the electronic component itself and the gaps between the electronic components and the annular cavity 112, thereby achieving relative fixation between the electronic components and the annular cavity 112. The other side of the filling member 15 is relatively smooth and is contacted with the human body.

Further, the filling member 15 may be made of resin, plastic, silicone, rubber or other materials.

Through the implementation of the above technical solution, a connection casing 113 is arranged between the first casing 111 and the second casing 115, the connection casing 113 is made of non-metallic materials, such design reduces the overall weight and material cost of the smart wearable device 10, and improves the overall comfort of the smart wearable device 10. At the same time, in the process of signal transmission and human-computer interaction, the technical means of the convex bump 151 is introduced, so that the present disclosure further improves the accuracy of human-computer interaction and signal transmission of the smart wearable device 10, and improves the performance of the smart wearable device 10.

The above embodiments, which are described in detail, are merely some implementations of the present disclosure, but they should not be construed to limit the scope of the present disclosure. It should be pointed out that, various modifications and improvements can be made by those skilled in the art without departing from the concept of the present disclosure. These modifications and improvements shall be encompassed by the protection scope of the present disclosure as defined by the appended claims.

What is claimed is:

1. A smart wearable ring device comprising:

a casing comprising;

a first casing;

a second casing arranged spaced apart from the first casing and being annular; and a connection casing arranged between the first casing and the second casing, wherein at least one of the connection casing, the first casing, and the second casing is made of non-metallic materials;

wherein the first casing, the second casing, and the connection casing surrounds as an annular cavity;

wherein the first casing comprises a first inner surface and a first side surface, the first inner surface and the first side surface are perpendicular to each other; the second casing comprises a second inner surface and a second side surface, the second inner surface and the second side surface are perpendicular to each other; and the first side surface and the second side surface have a stepped structure, wherein a density of materials of the connection casing is less than a density of materials of the first casing and/or the second casing; and the connection casing comprises a connection member and a connection body; wherein one end of the connection member is contacted with the first inner surface, and another end of the connection member is contacted with the second inner surface, the connection body and the connection member are formed integrally, the connection body is sandwiched between the first side surface and the second side surface, a cross section of the connection body and the connection member appears as a convex shape;

a circuit assembly arranged in the annular cavity; and a filling member cooperated with the casing;

wherein the casing, the circuit assembly, and the filling member are arranged in sequence from outside to inside, the circuit assembly is accommodated between the casing and the filling member.

2. The smart wearable ring device according to claim 1, wherein the connection casing is made of the non-metallic materials, and the first casing and the second casing are made of metal materials.

3. The smart wearable ring device according to claim 1, wherein:

the annular cavity has a depth;

the circuit assembly comprises a plurality of electronic components, and each of the plurality of electronic components has a height;

the height of at least one of the plurality of electronic components is greater than or equal to the depth of the annular cavity.

4. The smart wearable ring device according to claim 1, wherein the circuit assembly comprises:

a circuit board that is a bendable circuit board;

a power module electrically coupled to the circuit board;

a signal module arranged on the circuit board and electrically coupled to the power module; and a processor arranged on the circuit board, and electrically coupled to the signal module.

5. The smart wearable ring device according to claim 4, wherein the bendable circuit board comprises:

a plurality of rigid circuit boards, wherein a quantity of the plurality of rigid circuit boards is greater than or equal to 3; and a plurality of flexible connection members arranged between the plurality of rigid circuit boards.

6. The smart wearable ring device according to claim 4, wherein the signal module comprises:

a plurality of light emitting units; and a plurality of sensing units arranged at intervals relative to the plurality of light emitting units.

7. The smart wearable ring device according to claim 6, wherein a surface of the filling member defines a convex bump, the convex bump corresponds to a position of each of the plurality of sensing units.

* * * * *